United States Patent [19]

Becker et al.

[11] 4,351,653

[45] Sep. 28, 1982

[54] METHOD FOR PRODUCING SEPARATING NOZZLE ELEMENTS

[75] Inventors: Erwin W. Becker; Wolfgang Ehrfeld; Gunther Krieg, all of Karlsruhe; Wilhelm Bier, Eggenstein-Leopoldshafen, all of Fed. Rep. of Germany

[73] Assignee: Kernforschungszentrum Karlsruhe Gesellschaft mit beschrankter Haftung, Karlsruhe, Fed. Rep. of Germany

[21] Appl. No.: 178,569

[22] Filed: Aug. 15, 1980

[30] Foreign Application Priority Data

Aug. 18, 1979 [DE] Fed. Rep. of Germany ....... 2933570

[51] Int. Cl.$^3$ .............................................. B01D 19/00
[52] U.S. Cl. .......................................... 55/394; 55/17; 204/11; 430/296; 430/326
[58] Field of Search ............... 430/320, 296, 325, 326, 430/324; 55/17, 434, 392, 394; 204/11

[56] References Cited

U.S. PATENT DOCUMENTS 3,853,528 12/1974 Wodrich et al. ......................... 55/17
4,011,351 3/1977 Gipstein et al. ...................... 430/296
4,246,076 1/1981 Gardner ................................. 204/11
4,264,714 4/1981 Trausch ............................... 430/234
4,267,257 5/1981 Poliniak ............................... 430/296
4,272,266 6/1981 Tybus et al. ............................. 55/17

FOREIGN PATENT DOCUMENTS 1198328 8/1965 Fed. Rep. of Germany .......... 55/17

OTHER PUBLICATIONS

Becker-The Separation Nozzle Process for Enrichment of U-235 Pergamon Press Nuclear Energy, vol. 1, pp. 27-39.

*Primary Examiner*—Bernard Nozick
*Attorney, Agent, or Firm*—Spencer & Kaye

[57] ABSTRACT

A separating nozzle element composed of a separating body and end plates enclosing the body, for separating components of gaseous or vaporous mixtures, the separating body being provided with separating structures which delimit separating chambers and gas conduits and the end plates being provided with channels for supplying gas to, and removing gas streams from, the separating chambers and conduits, in which the separating body is produced in successive contiguous layers by carrying out the following sequence of steps a plurality of times until a given separating body thickness is achieved: providing a mold layer; irradiating selected portions of the layer with radiation in a spatial pattern corresponding to the separating structures to render only selected regions of the layer which correspond to the separating structures removable in a predetermined manner; removing the selected regions; and filling the spaces thus created in the layer with a material which is compatible with the gaseous or vaporous mixture whose components are to be separated, in order to form a laminar portion of the separating structures, and after the desired thickness is achieved, removing the remaining material of the mold layers.

13 Claims, 8 Drawing Figures

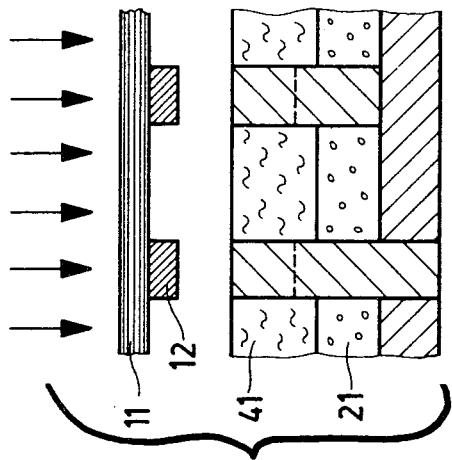
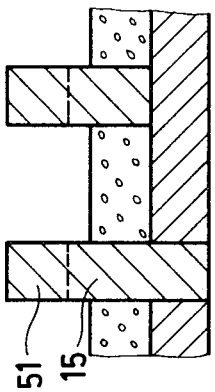
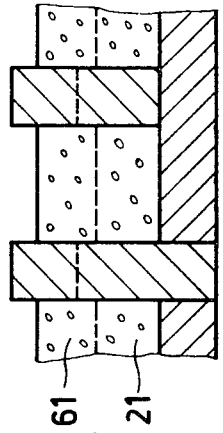
Fig. 4　　Fig. 5　　Fig. 6
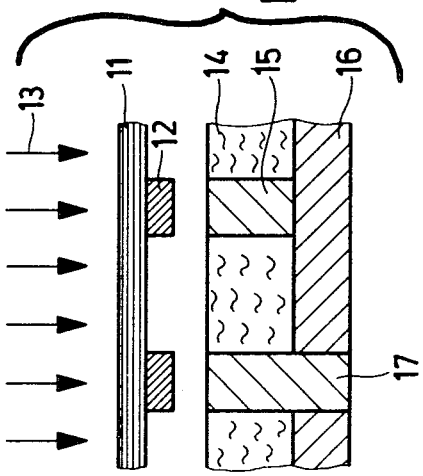
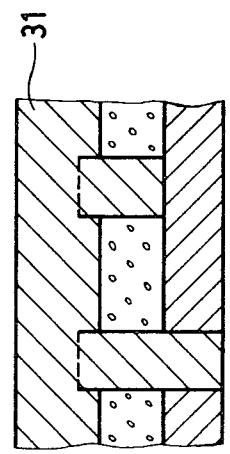
Fig. 1　　Fig. 2　　Fig. 3

METHOD FOR PRODUCING SEPARATING NOZZLE ELEMENTS

BACKGROUND OF THE INVENTION

The present invention relates to a method for producing separating nozzle elements for separating gaseous mixtures, particularly isotope mixtures, the nozzle element being of the type composed of a separating body, and end plates, with separating structures passing through the separating body to define separating chambers and gas flow conduits, and the end plates being provided with openings for the flow of gas into and out of the separating body.

When separating components, e.g. isotopes, of a gas mixture with a separating nozzle, the gas pressure leading to minimum specific energy consumption is inversely proportional to the characteristic dimensions of the separating structure, as disclosed in the publication Chemie Ing. Technik [Chemical Engineering Technology] Vol. 39 (1967) at page 4. Since the specific costs for the compressors, conduits and valves required to perform this method decrease considerably with increasing gas pressure, it is desirable to make the separating nozzle structure as small as possible. An inlet pressure of e.g. 0.5 bar here corresponds to a skimmer slot width of only about 10 $\mu$m.

It is known to produce separating nozzles with particularly small characteristic dimensions by assembling them of a stack of mutually aligned foils each of which is provided with a plurality of passages having the cross-sectional configuration of the gas inlet channel, the curved Laval nozzle, the skimmer and the discharge channels, as described in U.S. Pat. No. 3,853,528. According to preferred forms of construction, the shape of the passages is etched out in the foils.

To achieve a further reduction in size of the separating nozzle structure for the reasons mentioned above, the requirements for accuracy in the mutual alignment of the foils increase in correspondence with the reduction in size of the structure. At the same time, due to the increasing pressure differences between the various regions of the separating structures, the leakage currents which cannot be completely avoided increase along the foil surfaces.

SUMMARY OF THE INVENTION

It is the object of the present invention to produce separating nozzle elements of the above-mentioned type which have extremely small characteristic dimensions and in which the above-mentioned difficulties encountered in connection with stacks of foils are avoided.

This and other objects are achieved, according to the invention, by producing a separating nozzle element composed of a separating body and end plates enclosing the body, for separating components of gaseous or vaporous mixtures, the separating body being provided with separating structures which delimit separating chambers and gas conduits and the end plates being provided with channels for supplying gas to, and removing gas streams from, the separating chambers and conduits, by the steps of:

producing the separating body in successive contiguous layers by carrying out the following sequence of steps a plurality of times until a given separating body thickness is achieved:

providing a mold layer of a material whose ability to be removed by a predetermined procedure is influenced by that application thereto of radiation of a given type;

irradiating selected portions of the layer with an effective amount of the given type of radiation in a spatial pattern corresponding to the separating structures to render only selected regions of the layer which correspond to the separating structures removable in the predetermined manner;

removing the selected regions by performing the predetermined procedure on the irradiated layer;

filling the spaces created in the layer by said step of removing with a material which is compatible with the gaseous or vaporous mixture whose components are to be separated, in order to form a laminar portion of the separating structures; and removing the remaining material of the mold layers.

With the method according to the invention it is possible to realize, even with the smallest structure possible for use in industry, such high ratios of thickness of the individual layers of material to the narrowest width of the passages, or aspect ratios, that irregularities in the separating nozzle structure produced due to tolerance variations occuring during repeated mutual alignment of irradiating device and regions to be irradiated will not significantly interfere with the separating output. The structure material, which is applied in stages, forms a homogenous body in which no significant leakage currents occur.

To reduce the costs of alignment, it may be advisable to make the mold, or shaping, layers, which are filled with the material forming the nozzle structure, insensitive to radiation before the next layer of mold material is applied, as this is possible, for example, by treatment with gamma radiation, with heat or by chemical means. With this procedure it is accomplished that during irradiation of the newly applied layer of mold material a subsequent faulty irradiation of the preceding layer of shaping material will remain without effect.

The body produced according to the method of the present invention and containing the separating structures can be terminated by pressed-on end plates which are provided with gas carrying channels. However, it is of particular advantage to apply these plates, which contain the channels for supplying and removing the gas streams, by producing corresponding molds and filling them with structure material according to the method of the invention so that they tightly adhere to the separating body. This eliminates the need for pressing devices and avoids the possible occurrence of leakage gas currents betweeen the plates and the separating body.

When separating nozzle elements were assembled of foils, all of the parts of material which form the separating structure had of course to be spatially contiguous. The requirement for spatial contiguity, particularly in complicated separating nozzle structures as they are to be used to improve the economy of operation of the separating nozzle method, leads to restrictions in the design of the structures and thus in some cases to considerable technical and economic drawbacks. The method according to the invention makes it possible to produce separating nozzle elements of the above-mentioned type with extremely small characteristic dimensions in which the restricting requirement for spatial contiguity of the material forming the separating structures no longer exists. It is merely necessary to perform the step-wise assembly of the separating body on a base plate, preferably one of the end plates provided with channels for supplying and removing the gas streams.

Electromagnetic waves which should have wavelengths of <400 nm in order to provide sufficient optical resolution can be used as the high energy radiation. Particularly thick layers associated with a high aspect ratio can be produced with so-called soft X-rays whose wavelengths lie between 0.1 and 10 nm. Such rays can be produced with suitable X-ray tubes, with electron synchrotrons or with a microplasma generated by means of a giant pulsed laser.

While the desired structures are produced in a known manner by means of masks when electromagnetic radiation is used, the structures in the mold material can also be produced by electromagnetic control when high energy corpuscular beams, particularly electron beams, are used.

Various materials can be used for the molds, for example plastics of the type which have found acceptance for the lithographic production of microelectronic circuits (resists) e.g. PMMA (polymethylmethacrylate). Partial removal of material after exposure to high energy radiation can be effected in this case, for example, by dissolving it out with methyl isobutyl ketone (MIBK) or with a mixture of MIBK and isopropyl alcohol (IPA). Complete removal of the mold material is possible, for example, with chlorobenzene or acetone.

However, it is also possible to use so-called photo mold glass (modified lithium silicate) or Se-Ge glasses for producing the molds, in which case the partial dissolving out is effected with diluted acid or alkali.

The filling of the molds with structure material can be effected in different ways, e.g. by chemical deposition, vapor deposition or sputtering. The method according to the invention can be used with particularly good industrial and economic success if the mold material is an electrical nonconductor of the above-mentioned type, the material for the separating body, the base plate or the end plates, respectively, is an electrical conductor, and the molds are filled electrochemically.

BRIEF DESCRIPTION OF THE DRAWING

FIGS. 1 through 6 are simplified cross-sectional views showing stages in the production of separating structures.

According to a preferred embodiment of the invention.

DESCRIPTION OF THE PREFERRED EMBODIMENTS

Figure 7:
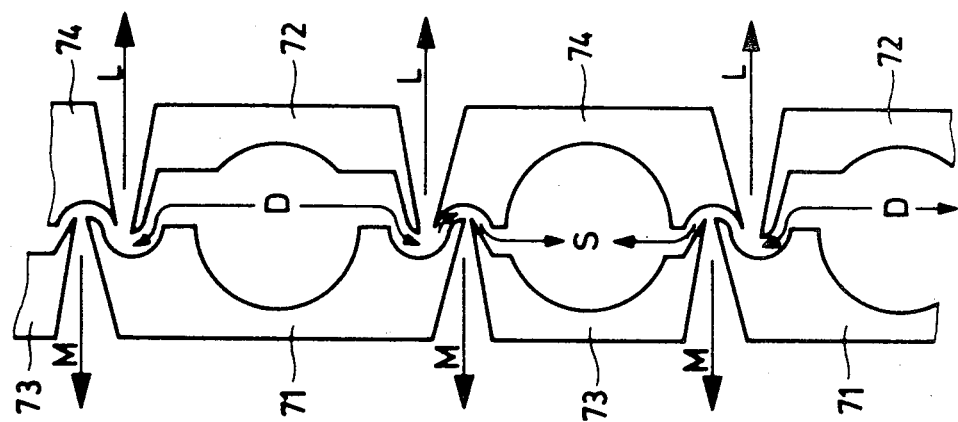
FIG. 7 is a top plan view of a portion of a separating body produced according to the invention which includes a so-called "double deflection system" as the separating nozzle structure.

In the procedure illustrated in FIGS. 1 through 6, a so-called positive resist, e.g. PMMA, is used as the mold material whose solubility is increased by irradiation. FIG. 1 illustrates a mask composed of a substrate 11 which only weakly absorbs the radiation to be employed in the process and structures 12 secured to the substrate and made of a material which heavily absorbs that radiation and which correspond to the cross-sectional shapes of the chambers and conduits of the separating structures. The arrows 13 symbolize the radiation. The radiation passing through the mask impinges on a layer of mold material to create in that layer regions 14 where the mold material which has been made soluble by irradiation and regions 15 of the mold material which are not struck by the radiation and thus have remained insoluble. The layer of mold material has been applied to an electrically conductive base plate 16 which is penetrated by channels 17 provided for supplying and removing gas streams in the finished nozzle, so that it simultaneously forms one of the end plates of a nozzle assembly.

After partial irradiation in the manner shown in FIG. 1, the irradiated regions 14 of the mold material are dissolved away so that a mold layer consisting of unirradiated material in regions 15 remains on the base plate 16. The spaces between regions 15 are substantially filled with structure material 21, e.g. nickel, by an electrochemical deposition procedure, as shown in FIG. 2.

In FIG. 3 the surface facing the radiation source has again coated with a further layer mold material 31. After renewed alignment of the mask 11, 12, this layer 31 is partially irradiated as shown in FIG. 4, thus producing soluble regions 41 which lie above the regions containing structure material 21. By dissolving away the regions 41 there results, as shown in FIG. 5, a new mold layer 51 which is a continuation of the mold layer 15.

FIG. 6 shows the state after renewed electrochemical deposition of structure material 61 in the spaces between regions 51 which forms a homogenous body with the structure material 21. This stepwise procedure is repeated until the separating body has reached its desired thickness. Then the remaining mold material in regions 15 and 51 is dissolved away.

The broken lines in FIGS. 3 through 6 represent the limits of the production steps between regions with essentially homogeneous material.

In some cases it may be advisable to use a negative resist whose solubility is reduced by irradiation instead of the positive resist used in the embodiment shown in FIGS. 1 through 6. The structures of the mask which are highly absorptive of radiation must then constitute the negative of the cross-sectional shapes of the openings defining the chambers and conduits of the separating structure. The decision as to which type of resist to use depends, inter alia, on the shape and the desired arrangement of the separating structures.

In the double deflection system having the form shown in FIG. 7 and produced in the manner described above, a mixture D of components to be separated is separated into fractions L, M, S by double, oppositely directed deflections, each time with subsequent separation. The light fraction L contains the highest proportion of light components, the medium fraction M corresponds in its composition approximately to that of the mixture D to be separated, and the heavy fraction S contains the highest proportion of heavy components.

As can be seen in FIG. 7, the parts 71, 72, 73 and 74 forming the separating body are not spatially contiguous. Their mutual alignment is assured exclusively by means of a base plate (not shown) on which those parts are formed to be free standing. The illustrated arrangement has the advantage that the introduction of the mixture D to be separated and the removal of the heavy fraction S is effected in common for two adjacent separating nozzle systems, which considerably reduces the space requirement for the gas supply lines with a given pressure drop. Moreover, the light and medium fractions reach the subsequent gas collection chambers over the shortest possible paths. It is directly evident that this advantageous manner of conducting the gas is made possible by the free standing arrangement.

Figure 8:
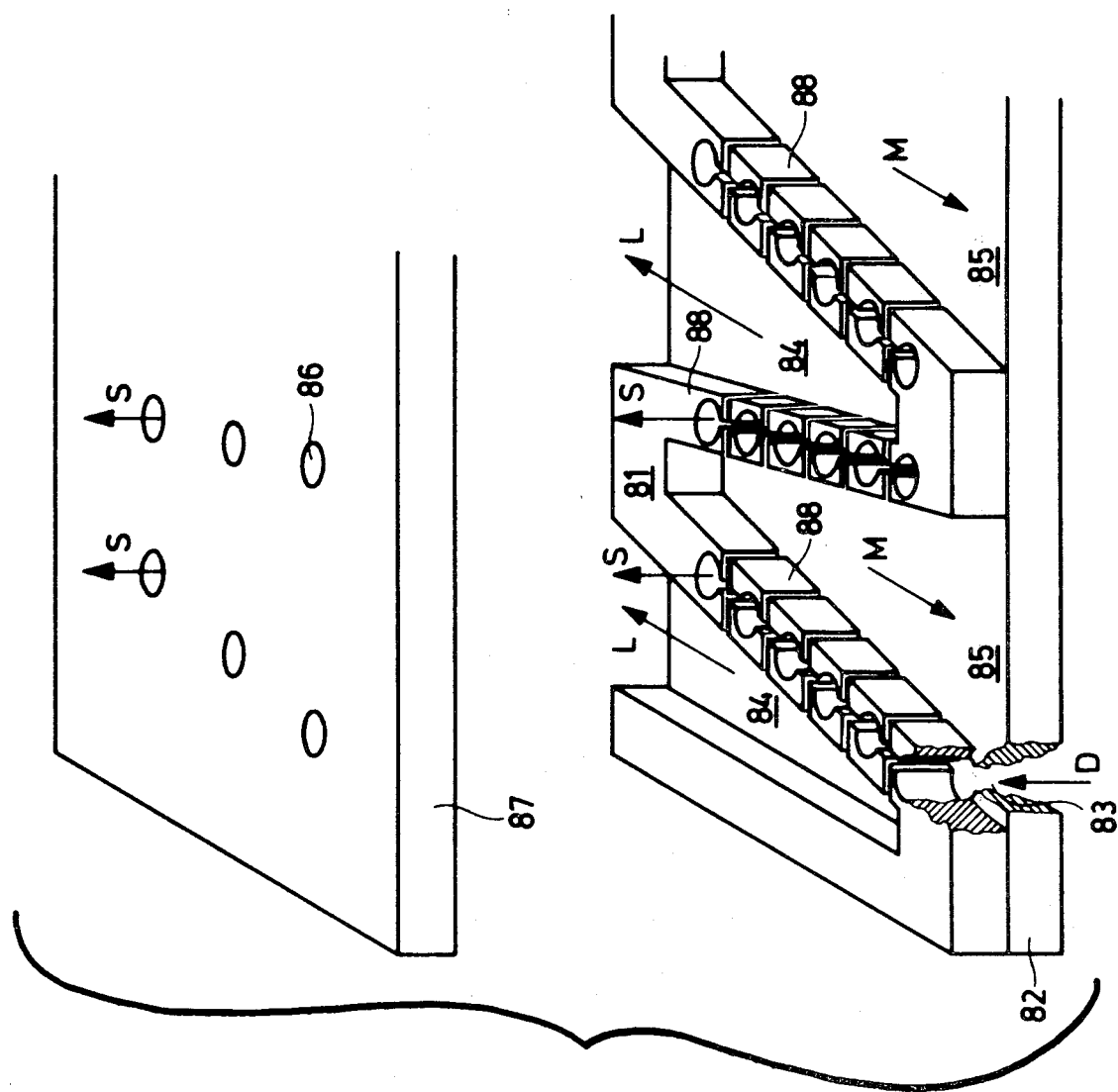
FIG. 8 is a partly exploded, partly broken-away perspective view of a separating nozzle element produced according to the invention with the upper end plate lifted off and employing a separating body according to FIG. 7.

In the separating nozzle element shown in FIG. 8, a separating body 81 having a serpentine (zigzag) form is mounted on a base plate 82, on which body 81 can have been formed. The base plate 82 is penetrated by channels 83 through which the separating body 81 is supplied with the gaseous mixture D to be separated. The separating body 81 divides the mixture D into the fractions L, M, and S. The fraction L flows into the V-shaped gas collection chambers 84 formed on the bars 88 and end plates 82 and 87, the back of the chambers 84 being open. The fraction M flows into the likewise V shaped gas collection chambers 85 whose front is open. The fraction S flows toward the top into the channels 86 of the upper end plate 87 which has been lifted off in FIG. 8. For the sake of clarity, the separating structures formed in the bars 88 of the separating body are shown in a greatly simplified manner merely to clarify the principle of conducting the gas streams.

In FIG. 8 adjacent separating nozzle structures have common gas lines within the separating body for the mixture D to be separated and for the heavy fraction S. In some cases it may be advisable to provide other arrangements within the scope of the present invention. For example, the separating structures may be arranged in such a manner that the common gas lines can each be used to remove the light or medium fraction, respectively. The mixture to be separated can then be supplied and the heavy fraction removed through the gas collection chambers 84 and 85, respectively. A decision as to which arrangement to use depends, inter alia, on the intended manner of installing the separating nozzle elements in industrial separating devices.

For producing separation elements with extremely small dimensions, polymethylmethacrylate (PMMA) is used as a mold material. The incremental PMMA layers consist of solid PMMA foils which are linked together by a solvent or an organic adhesive. Also liquid type PMMA resist layers are used which are dried under vacuum conditions and prebaked at moderate temperatures. The optimum thickness of the incremental layers depends on the desired size of the separation nozzle structure, the energy of the radiation, and the mechanical properties of the different mold materials. According to these parameters the thickness of a layer is chosen between 20 and 200 $\mu$m. For irradiating selected portions of the PMMA layers soft X-rays are used, the wavelength of which is between 0.1 and 10 nm. To permit a selective removal of the irradiated portions the amount of radiation which must be applied is in the order of $10^2$ to $10^3$ J/cm$^3$. The irradation time is between 1 and 10 minutes when the X-rays are generated by means of an electron synchrotron. The irradiated portions of the incremental layers are removed by dissolving out the irradiated material with a mixture of methylisobutylketone (MIBK) and isopropyl alcohol (IPA). The spaces created in the layers are filled with nickel which is deposited electrochemically from a nickel sulfamate solution. The separating body consists of 5 to 20 incremental layers.

The remaining mold material of the incremental layers becomes insoluble in the MIBK/IPA mixture, when the material is irradiated with a comparatively high amount of radiation in the order of $10^5$ to $10^6$ J/cm$^3$. This procedure results in a cross-linking process of the PMMA molecules. The cross-linked material is insoluble in the MIBK/IPA solvent and hence, it is insensitive to further radiation. In contrast to the behavior of PMMA at high radiation levels, a low amount of radiation (10 J/cm$^3$) preferably results in a chain scission process of the PMMA molecules, which increases the solubility of the material in a MIBK/IPA mixture. Furthermore, the sensitivity to a given type of radiation is reduced by a postbake process at elevated temperature.

Besides PMMA conventional photosensitives resists, e.g. diazo resists are used as a mold material for producing separation nozzle elements with larger dimensions. The conventional photosensitive resists are applied as foils or as a liquid type resist. The resist material is irradiated by means of radiation generated with a discharge lamp. The wavelength of the radiation is in the order of 400 nm.

It will be understood that the above description of the present invention is susceptible to various modifications, changes and modifications, and the same are intended to be comprehended within the meaning and range of equivalents of the appended claims.

What is claimed is:

1. A method for producing a separating nozzle element composed of a separating body and end plates enclosing the body, for separating components of gaseous or vaporous mixtures, the separating body being provided with separating structures which delimit separating chambers and gas conduits and the end plates being provided with channels for supplying gas to, and removing gas streams from, the separating chambers and conduits, comprising:

(a) producing the separating body in successive contiguous layers by carrying out the following sequence of steps a plurality of times until a given separating body thickness is achieved:
      (i) providing a mold layer of a material whose ability to be removed by a predetermined procedure is influenced by that application thereto of radiation of a given type;
      (ii) irradiating selected portions of the layer with an effective amount of the given type of radiation in a spatial pattern corresponding to the separating structures to render only selected regions of the layer which correspond to the separating structures removable in the predetermined manner;
      (iii) removing the selected regions by performing the predetermined procedure on the irradiated layer; and
      (iv) filling the spaces created in the layer by said step of removing with a material which is compatible with the gaseous or vaporous mixture whose components are to be separated, in order to form a laminar portion of the separating structures; and
   (b) removing the remaining material of the mold layers.

2. A method as defined in claim 1 further comprising rendering each mold layer insensitive to the given type of radiation after each said step of filling and before the next succeeding step of providing.

3. A method as defined in claim 1 or 2 wherein the material of the mold layer is an electrical nonconductor, the material employed in each said step of filling is an electrical conductor, and each said step of filling is carried out by an electrochemical deposition operation.

4. A method as defined in claim 1 or 2 comprising the preliminary step of forming one end plate by providing a base plate and forming channels therein, and wherein the separating body is produced on said end plate.

5. A method as defined in claim 1 or 2 wherein the material of the mold layer is an electrical nonconductor, the materials employed in each said step of filling and for the end plate are electrical conductors, and each said step of filling is carried out by an electrochemical deposition operation.

6. A method as defined in claim 1 wherein the given type of radiation has wavelength of less than 400 nm.

7. A method as defined in claim 6 wherein the given type of radiation comprises soft X-rays.

8. A method as defined in claim 1 wherein the given type of radiation is constituted by a corpusular beam.

9. A method as defined in claim 8 wherein the corpuscular beam is an electron beam.

10. A method as defined in claim 1 or 2 further comprising forming one of the end plates by disposing masses of mold material to conform to the channels of the end plate, and disposing material compatible with, and impervious to, the gaseous or vaporous mixtures in a layer around and between the masses of mold material to constitute the end plate.

11. A method as defined in claim 10 wherein the material of the mold layer is an electrical nonconductor, the materials employed in each said step of filling and for the end plate are electrical conductors, and each said step of filling is carried out by an electrochemical deposition operation.

12. A separating nozzle element produced according to the method defined in claim 1 and presenting a plurality of adjacent separating nozzle systems each having at least one separating chamber communicating with an associated inlet conduit and outlet conduit, wherein each said inlet conduit communicates with said chambers of an associated pair of adjacent nozzle systems and each said outlet conduit communicates with said chambers of an associated pair of adjacent nozzle systems.

13. A separating nozzle element produced according to the method defined in claim 1 wherein said separating body is composed of a plurality of elongate arm members connected end to end and extending along a serpentine path sandwiched between said end plates such that a respective gas collection chamber is formed between each pair of arms and associated portions of said end plates, each said arm presents a plurality of adjacent separating nozzle systems each having at least two outlet conduits for conducting respective components separated from the mixture, and said outlet conduits are arranged relative to said collection chambers such that the collection chambers located at respectively opposite sides of each said arm receive respectively different components from said nozzle structures presented by that said arm.

* * * * *